R. C. Sturges.
Saddle Pad.
Nº 86,112.  Patented Jan. 19, 1869.
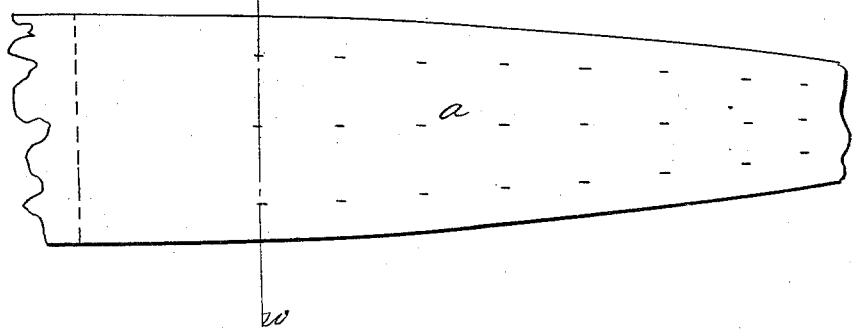
Witnesses.
J. Snowden Bell
Sydney E. Smith
Inventor:
Retire C. Sturges
By his attorney
Z. C. Robbins

RETIRE C. STURGES, OF BOSTON, MASSACHUSETTS, ASSIGNOR TO THE AMERICAN SADDLE COMPANY, OF THE SAME PLACE.

Letters Patent No. 86,112, dated January 19, 1869.

IMPROVED HARNESS-SADDLE PAD.

The Schedule referred to in these Letters Patent and making part of the same.

*To all whom it may concern:*

Be it known that I, RETIRE C. STURGES, of Boston, in the county of Suffolk, and State of Massachusetts, have invented a new and improved Pad for Harness-Saddles; and I do hereby declare that the following is a full and exact description thereof, reference being had to the accompanying drawings, which form a portion of this specification.

The distinguishing feature of my said improved pad is an impervious bearing-surface, of vulcanized rubber or gutta-percha.

In the accompanying drawings—

Figure 3 is a view of the under or bearing-surface of a half portion of my improved harness-pad, and Figure 4, a transverse section of the same, in the line $v\ w$ of fig. 3.

My improved pad may be stuffed with any suitable material, and may be stitched and stayed in any suitable manner.

The vulcanized-gum bearing-surface $a$ of said pad I usually combine with some strengthening fibrous fabric, $b$, possessing a sufficient degree of strength to hold the stitches and stays required to unite the same with the upper covering, $c$, of the pad.

The following are some of the good qualities of my improved pad:

The stuffing of the pad is never injured by animal exudations.

The bearing-surface of the pad can always be kept clean, smooth, and soft, and, consequently, an animal never galls when working under one of these pads; and, in repeated instances, it has been found that horses and mules, whose backs had become galled whilst working under other pads, have been entirely cured whilst working steadily under my said improved pads.

What I claim as my invention, and desire to secure by Letters Patent, as a new manufacture, is—

An improved pad for harness-saddles, the distinguishing feature of which is an impervious bearing-surface, of vulcanized rubber, combined with the other portions of the pad, substantially as herein set forth.

The aforegoing specification of my improved pad for harness and other saddles signed and witnessed, this 7th day of September, 1868.

R. C. STURGES.

Witnesses:
T. J. BRYANT,
J. CAHOON.